July 14, 1953     R. W. CAMPBELL     2,645,393

WATER BAG CARRIER FOR MOTOR VEHICLES

Filed Jan. 17, 1951

Ralph W. Campbell
INVENTOR.

BY *Clarence A. O'Brien*
*and Harvey B. Jackson*
Attorneys

Patented July 14, 1953

2,645,393

UNITED STATES PATENT OFFICE 2,645,393

WATER BAG CARRIER FOR MOTOR VEHICLES

Ralph W. Campbell, Deaver, Wyo.

Application January 17, 1951, Serial No. 206,437

5 Claims. (Cl. 224—42.03)

This invention comprises novel and useful improvements in a water bag carrier for motor vehicles and more specifically pertains to a supporting attachment adapted for application to the bumpers of any conventional motor vehicle for supporting a water bag thereon in various adjusted positions.

The primary object of this invention is to provide an improved carrier for adjustably supporting a water bag from the bumpers of motor vehicles.

A further object of the invention is to provide a water bag carrier in conformity with the preceding object which shall be capable of securely supporting the water bag and holding the same in fixed position at both its top and lower sides, and which shall be readily applicable to various types of motor vehicles and may be applied to various styles of bumpers for the same.

These, together with various ancillary features and objects of the invention, which will later become apparent as the following description proceeds, are attained by the present invention, a preferred embodiment of which has been illustrated, by way of example only, in the accompanying drawings, wherein.

Referring now more specifically to the accompanying drawings, wherein like numerals designate similar parts throughout the various views, there will be seen that the numeral 10 indicates generally a motor vehicle of any conventional design which is provided with a bumper 12 which may constitute either a front or rear bumper of the same, as desired.

Figure 2:
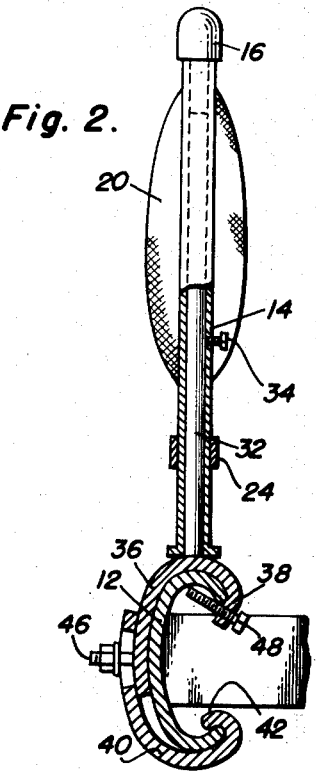
Figure 2 is a vertical central sectional view taken substantially on the plane indicated by the section line 2—2 and showing certain structural details of the adjustable carrier and the manner of adjustably securing the same to the front bumper of a motor vehicle.

As shown best in Figure 2, this bumper 12 is substantially a C-shape in cross section, in accordance with conventional practice, and it is to this bumper that the present invention is to be applied.

For certain persons, such as those having occasion to travel or work in the desert, or to move long distances from a source of water, it is necessary and expedient to carry a water bag with them. However, such a bag if carried upon the outside of a motor vehicle frequently tends to rub or chafe the vehicle or bag, thus marring the appearance of either and inflicting damage upon the rubbing surfaces. Attempts have been made heretofore to provide a support for mounting such a bag upon the exterior of a vehicle, but to my knowledge they have not been satisfactory because of the aforesaid unrestricted movement of the bag with rubbing against the adjacent surface of the vehicle.

In the present invention, there is provided a tubular vertical standard 14 having an elbow 16 at its upper end from which extends a laterally disposed pipe 18. A conventional form of water bag 20 is dependingly secured to this pipe as by straps or clamps 22, as illustrated in Figure 1.

Figure 3:
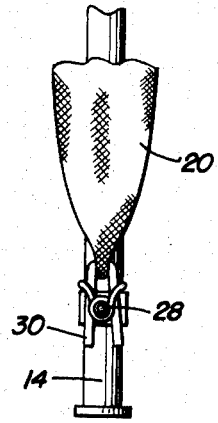
Figure 3 is an end elevational detail view taken substantially from the left end of Figure 1.

In order to prevent the bag from having unrestricted swinging movement upon the laterally extending arm 18, a collar 24 is slidably positioned upon the standard 14 and is vertically adjusted thereon as by a set screw or the like 26. Welded or otherwise rigidly attached to this collar 24 is a laterally extending rod 28, which, as shown in Figures 1 and 3, is provided with a pair of clips 30 of any conventional design which are adapted to engage the lower end of the bag and secure the same to the rod 28 and thus prevent swinging movement of the bag.

It will be readily appreciated that the rod 28 and clamp 24 may be adjusted both vertically of the standard 14 and rotatably thereabout as found to be necessary in order to properly position the bag 20.

Figure 1:
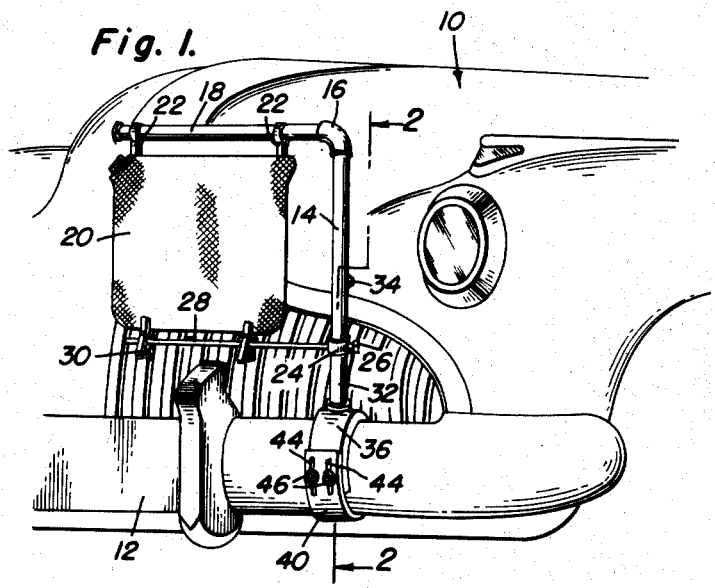
Figure 1 is a perspective view of the front end of a motor vehicle showing the water bag carrier attachment, forming the subject of this invention, applied thereto.

The tubular standard 14 is telescopingly and slidingly received upon a vertical support rod 32, see Figures 1 and 2, and a set screw 34 extending through the tubular standard which enables both rotational and vertical adjustment of the standard with respect to the support rod 32.

The support rod at its lower end is welded or otherwise rigidly attached to the upper portion of an arcuate member 36, having a hooked extremity 38 which, as shown in Figure 2, is adapted to overlie and embrace the upper curved edge of the member 12. A complementary arcuate member 40 is provided with a hooked portion 42 at its lower end which is adapted to underlie and embrace the curved lower edge of the bumper 12. The member 40 has the end adjacent to member 36 adapted to overlie and slidably engage the same, and a pair of adjustable clamping means is provided for adjustably locking these two members 36 and 40 upon the bumper 12 in tight clamping engagement therewith.

This clamping means preferably comprises a pair of longitudinally extending vertical slots 44 disposed in the member 40, and studs or bolts 46 are secured to the member 36 and are slidingly received in these slots. Thus, the two members 36 and 40 may be adjusted with respect to each other and detachably clamped upon the bumper.

In order to further prevent displacement of the clamp and of the support standard upon the bumper, the hooked extremity 38 of the member 36 is provided with a set screw 48 which is adapted to underlie the curved upper end of the bumper 12, as clearly shown in Figure 2.

From the foregoing, it will be apparent that the clamp may be enlarged or contracted as found necessary to enable the same to accommodate itself to various types of bumpers, and the hooked extremities 38 and 42 will securely clench themselves upon curved bumpers as illustrated. In addition, the locking screw 48 further assures a fixed attachment of the clamp to the bumper. With the clamp fixed, it is evident that the tubular standard 14 may be adjusted vertically or rotationally in order to position the lateral support of 18 and the water bag 20 depending therefrom in any desired relation with respect to the motor vehicle, and the lower end of the bag may then be suitably secured and held in the desired position by the lateral support rod 28 with the clamp 30 attached thereto.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A water bag carrier for motor vehicles comprising a vertical support standard having a laterally extending arm for dependingly supporting a water bag, a collar slidably mounted on said standard and adjustable both vertically and horizontally of said standard, a rod extending laterally from said collar, means on said rod detachably engaging the lower end of a water bag, a clamp for mounting said standard upon the bumper of a motor vehicle.

2. The combination of claim 1 wherein said clamp has a vertical support, said standard being telescopingly engaged with said support, means securing said standard and support in vertically adjusted position.

3. The combination of claim 1 wherein said clamp comprises a pair of arcuate members having hooked opposite ends for engaging the edges of a bumper and overlapped adjacent ends, means for securing said members together in adjusted position.

4. The combination of claim 3 wherein said last means includes a slot in one member and a fastening bolt in the other member extending through said slot.

5. The combination of claim 3 wherein said last means includes a slot in one member and a fastening bolt in the other member extending through said slot, a set screw carried by one member and engaging the underside of a bumper.

RALPH W. CAMPBELL.

References Cited in the file of this patent

UNITED STATES PATENTS

| Number | Name | Date |
| --- | --- | --- |
| 301,916 | O'Niel | July 15, 1884 |
| 1,280,955 | Bowen | Oct. 8, 1918 |
| 1,564,703 | Nichols | Dec. 8, 1925 |
| 1,689,436 | Hodge | Oct. 30, 1928 |
| 1,882,150 | Kent | Oct. 11, 1932 |
| 2,119,325 | Goodhart | May 31, 1938 |
| 2,447,771 | Rogers | Aug. 24, 1948 |
| 2,521,221 | Ivey | Sept. 5, 1950 |
| 2,561,199 | Harder | July 17, 1951 |